United States Patent [19]

Allinquant et al.

[11] 3,900,918

[45] Aug. 26, 1975

[54] MOTOR-DRIVEN MACHINE FOR TENDERIZING PIECES OF FOOD SUCH AS PIECES OF MEAT

[76] Inventors: Fernard Michel Allinquant; Jacques Gabriel Allinquant, both of 53, Avenue Le Notre, 92-Sceaux, France

[22] Filed: Sept. 6, 1973

[21] Appl. No.: 394,764

Related U.S. Application Data

[63] Continuation of Ser. No. 172,396, Aug. 17, 1971, abandoned.

[30] Foreign Application Priority Data

Aug. 18, 1970 France .............................. 70.30345

[52] U.S. Cl. ................................................ 17/25
[51] Int. Cl.² .......................................... A22C 9/00
[58] Field of Search ......................................... 17/25

[56] References Cited
UNITED STATES PATENTS
3,283,360  11/1966  Tamain ................................... 17/25
3,521,321  7/1970  Allinquant ............................. 17/25
3,583,025  6/1971  Jaccard ................................... 17/25

*Primary Examiner*—Warner H. Camp
*Attorney, Agent, or Firm*—William J. Daniel

[57] ABSTRACT

A machine for tenderizing pieces of food, in particular pieces of meat, which machine comprises a support on which a motor is mounted, means for guiding the support in an essentially vertical direction in response to a manual control, means for locking the support on the guide means to prevent relative movement therebetween and a set of blades arranged to be moved into and out of engagement with food to be tenderized by means of a reciprocating device which may take the form of a hand crank arrangement driven by the motor.

6 Claims, 4 Drawing Figures

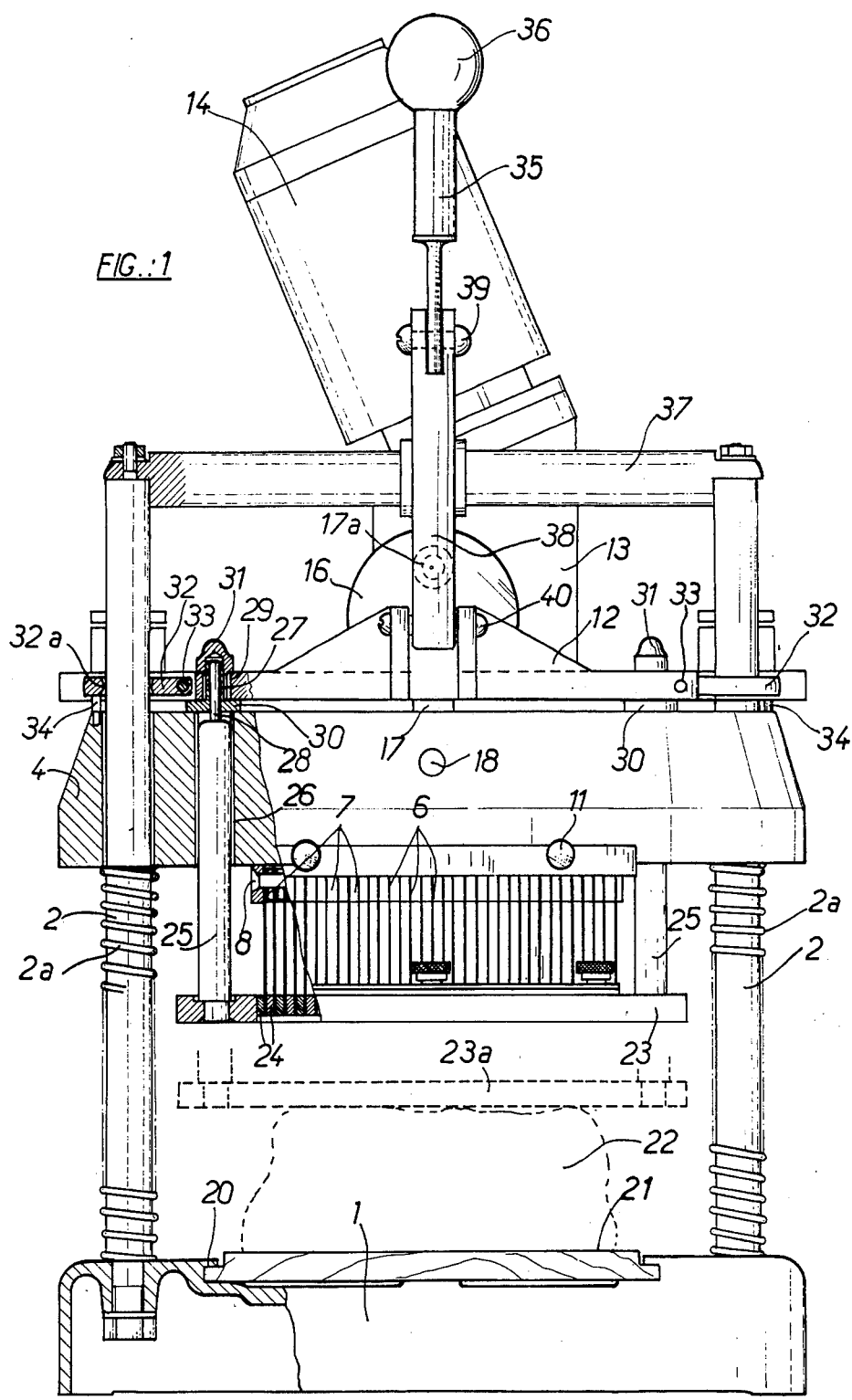

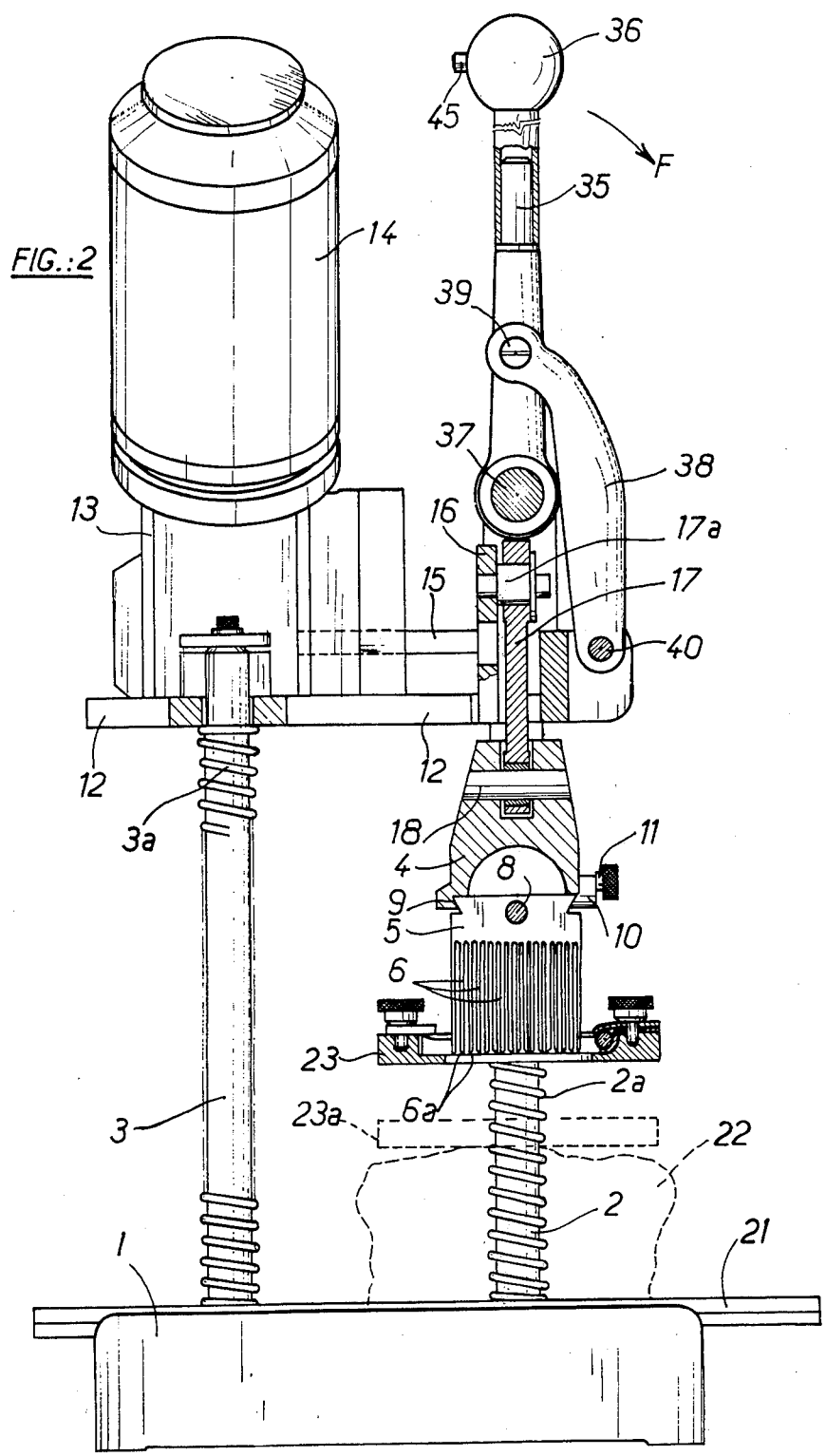

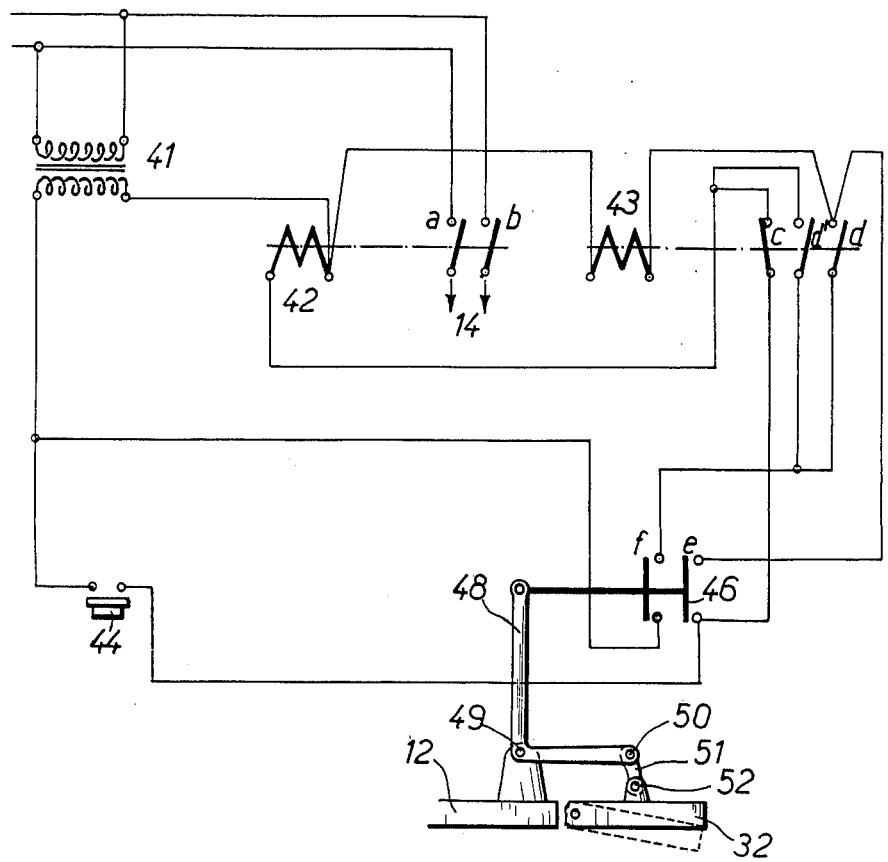
FIG.: 3
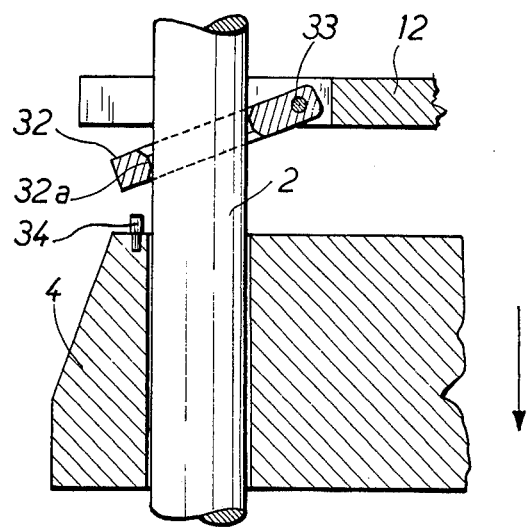
FIG.: 4

MOTOR-DRIVEN MACHINE FOR TENDERIZING PIECES OF FOOD SUCH AS PIECES OF MEAT

This is a continuation, of Ser. No. 172,396, filed Aug. 17, 1971 now abandoned.

The present invention relates to machines for tenderizing pieces of food and in particular pieces of meat, which comprise a set of parallel blades designed to be displaced towards a piece of food being tenderized in order to penetrate it and locally cut the fibres.

The invention relates to a device for assembling and driving the blades set by an electric motor, which device, in addition to advantages of power, also has the benefit of a simple, efficient and relatively inexpensive construction.

In accordance with the invention, there is provided a machine for tenderizing pieces of food, such as, for example, pieces of meat, said machine comprising a set of blades which can be displaced by a reciprocating device, the motor being mounted on a support to which the blade set is attached by the reciprocating device, and said support being mounted on a guide for vertical displacement under manual control in order to offer up the blade set to food being tenderized and said support further having a jammable connection which cooperates with said guide in order to lock or wedge the support in relation thereto and thus withstand the reaction of the reciprocating device when the motor is started.

The guide means may comprise at least three pillars, the set of blades being mounted in a carrying member guided on two of said pillars whose axes are in a vertical plane close to the plane of symmetry of the blade set and the motor support being guided not only on said two pillars but also on the or each other pillar whose axis is located beyond said plane.

Preferably, the locking means designed to immobilize the motor support, acts on at least one of the two pillars which guide the blade set carrying member. Preferably, it comprises at least one ring articulated to the motor support and embracing a guide pillar, the internal surface of said ring being flared at both ends.

An electrical contact system may be provided in order to energize the electric motor during a go and return cycle operation of the blade set.

The invention will now be further described, by way of example, with reference to the accompanying drawings, in which:

FIGS. 1 and 2 illustrate one embodiment of a machine in accordance with the invention, in the form of two vertical projections at 90° to one another, with partial sections and cutaways, showing the machine in the inoperative condition;

FIG. 3 is a diagram of an embodiment of the electrical supply circuit for the motor; and FIG. 4 illustrates on a larger scale, a detail of FIG. 1, depicting the position of a jamming ring when the blade set has commenced its movement.

In the embodiment illustrated in FIGS. 1 and 2 of the drawings, the machine comprises a fixed gallows-shaped framework made up of a horizontal base 1 designed to receive the piece of meat being tenderized, and four vertical pillars 2, 2, 3, 3, bolted to the base 1 at their root these pillars being arranged on the base at the corners of a rectangle.

The two front pillars 2 do duty as a guide vis-a-vis a component 4 in the form of a crossbeam, to which there is attached a set 5 of fine parallel blades 6 each terminating in a chisel cutting edge 6a.

These blades can for example be cut from sheets of steel such as those marked 5 in FIG. 2, and these sheets placed parallel to one another, with spacer washers 7 (FIG. 1) between them, the whole assembly being fitted over one or more rods 8 in order to form a set. The blade set is attached in some appropriate manner or other to the crossbeam 4 for example by a dovetailed arrangement as indicated by the reference 9 in FIG. 2, one of the sides 10 of the assembly being detachable thanks to the provision of knurled screws 11, in order to permit easy dismantling of the blade set for example in order to clean it.

The front pillars 2 as well as the two rear pillars 3, act as a guide to a plate 12 arranged above the beam 4 carrying the blades, said plate having fixed to it by means of a cradle or yoke 13, an electric motor 14 whose axis is disposed obliquely in the example in the drawing (see FIG. 1) for balance reasons.

The motor 14, through the medium of appropriate reduction gear, drives a horizontal shaft 15 rotating in bearings provided in the cradle 13 and consequently carried by the plate 12.

To the end of the shaft 15 there is keyed a crank plate 16 which is coupled by an eccentric pin 17a to the top end of a connecting rod 17 whose bottom end (FIG. 2) is articulated to a pin 18 associated with the crossbeam 4 carrying the blade set.

Said crossbeam, guided in the manner described hereinbefore on the two pillars 2, is supported by the connecting rod 17 but has no other connection with the plate 12.

On the pillars 2 and 3 there are located coil springs 2a, 3a, which carry the weight of the assembly constituted by the plate 12 with the components it carries, such as the motor 14, the cradle 13, etc., and by the crossbeam 4, the blade set 5, etc.

The fitted load of the springs, which are long and flexible, is arranged so that normally the said assembly is located and maintained in a top position (FIGS. 1 and 2) such that the blades set 5 is raised above the base 1 by a height greater than the maximum thickness of the pieces of meat which are to be processed.

The base 1 is preferably grooved, as indicated by the reference numeral 20 in FIG. 1, in order to take a detachable wooden board 21 upon which a piece of meat being tenderized is placed, the profile of the meat being suggested in broken line fashion at 22 in FIG. 2, the board serving to receive the tips of the blades when they pass through the piece of meat.

The blade set is associated with a guide and shield plate 23 whose general shape is that of a rectangular frame surrounding the tips of the blades and comprising cross pieces 24 (see FIG. 1) through the intervals of which the blades extend so that they are consequently positively guided. This frame 23, with its crosspieces 24 is fixed to the end of two small pillars 25 which are an easy sliding fit in guide bores 26 formed in the crossbeam 4, and are attached to the plate 12 by some appropriate means or other. The device shown in FIG. 1 comprises a threaded sleeve 27 into which the threaded tip 28 of the small pillar 25 is screwed, and which is engaged in a hole 29 in the plate 12. The sleeve 27 abuts against the plate 12 by means of a collar 30 and is held in position by a nut 31 screwed onto its tip above said plate.

The guiding of the plate 12, which as mentioned hereinbefore carries the motor 14, the shaft 15 and the crank plate 16 on the two front pillars 2, is effected by means of two rings 32. These rings are each articulated to the plate 12 about a horizontal pivot 33 perpendicular to the vertical plane contained in the axes of the pillars 2. The internal surfaces 32a of these rings, which embrace the corresponding pillar 2 in each case, take the form of two conical frusta with their smaller bases adjoining and separated by a short cylindrical portion in the manner shown in the left hand part of FIG. 1 and also in FIG. 4. There is a clearance of some few tenths of a millimeter between the internal surface of each ring and the associated pillar.

Stops 34, one for each ring 32, and attached to the top part of the crossbeam 4, serve as an abutment for each of the rings 32, maintaining them in the horizontal position in the plane of the plate 12, when the machine is inoperative, the elements then having the positions shown in full line in FIGS. 1 and 2.

A lever 35 with a handle 36 is arranged to pivot in the direction of the arrow F in FIG. 2, about a fixed spindle 37 secured to the top ends of the two front columns 2 and therefore incorporated in the rigid framework they form with the base. A link 38 is articulated on the one hand, at 39, to an intermediate point on the lever 35 and on the other hand, at 40, to the internal edge of the plate 12 at the centre thereof, between the two pillars 2.

The operation of the machine is as follows:

In the inoperative condition, as mentioned hereinbefore, the joint 17a between the connecting rod 17 and the crank plate 16 is located at the top dead centre position, passing through the geometric axis of the shaft 15, as shown in FIGS. 1 and 2. The crossbeam 4 and the blade set 5, with the frame 23, thus occupy the uppermost position, the frame 23 being located at a distance from the board 21 which is greater than the maximum thickness of the piece of meat 22 which is going to be tenderized.

When the piece of meat 22 is placed on the board 21 and the machine set into operation, the lever 35 is gripped by the handle 36 and pivoted in the direction of the arrow F, about the spindle 37. By means of the link 38, this pivoting of the lever 35 lowers the plate 12 and the crossbeam 4 attached thereto through the connecting rod 17. The assembly slides along the pillars 2 and 3, compressing the springs 2a, 3a as it does so. This descending movement is continued until the frame 23 comes into contact with the piece of meat (the frame 23 is then in the position 23a shown in broken line in FIGS. 1 and 2).

If, then, by some suitable means or other (and embodiments of such means will be illustrated by way of example hereinafter), the electric motor 14 is started, the motor then rotates the shaft 15 and the crank plate 16. The latter acts upon the connecting rod 17 which then tends to move the plate 12 and the crossbeam 4 apart. As soon as this movement commences, the rings 32 articulated to the plate 12 cease to bear against the stops 34 and the crossbeam 4 and, being relatively heavy, take up the inclined position shown in FIG. 4. Thanks to the shape of their internal surfaces, defined hereinbefore, they then jam against the pillars 2 and take the reaction of the connecting rod 17, preventing the plate 12 from lifting. The rotation of the crank plate 16 thus has the effect, through the connecting rod 17, of lowering the crossbeam 4 and the blade set 5 in relation to the plate 12. Since the frame 23 is maintained in abutment against the piece of meat by the action of the rings 32, the blades slide through the frame and penetrate into the meat, cutting its fibres.

After a rotation of 180° on the part of the crank plate 16, the link 17 rises again and this movement is accompanied by an upward movement on the part of the crossbeam 4 and the blade set 6. In this phase of the movement, the springs 2a, compressed during the previous downward movement, expand and lift the crossbeam 4. The plate 12 remains stationary since from the frame 23 and through the small pillars 25, it receives the resisting force offered by the piece of meat to the extraction of the blades 6 and it receives also from the connecting rod 17 the force of the springs 2a which have been highly compressed by the crossbeam 4 during its downward stroke. Those forces are directed upwards and tend therefore to lift the plate 12. The rings 32 thus remain inclined downwards and continue to jam the plate against the pillars 2.

When the blades 6 are virtually completely withdrawn from the piece of meat, that is to say when the crossbeam 4 has risen to a point close to the plate 12, this resisting force disappears and at the end of the revolution of the crank plate 16 the stops 34 carried by the crossbeam 4 come up against the rings 32 and release them. The four springs 2a, 3a then cause the assembly of the crossbeam 4 and the plate 12 to rise back to the initial position shown in FIGS. 1 and 2.

The motor must be stopped as soon as the joint 17a linking the connecting rod 17 to the crank plate 16 has reached top dead centre, the crank plate 16 thus only executing one revolution, which corresponds to a go and return cycle on the part of the blades.

Various devices can be provided to ensure this effect. One of them will be described hereinafter.

It will be observed that thanks to the jammable arrangement constituted by the rings 32, the lever 35 can be released as soon as the frame 23 has arrived in contact with the piece of meat and the motor has started. The return upwards, of the crossbeam 4 and the plate 12, under the effect of the springs, will return the lever to its upright position at the end of the revolution of the crank plate 16.

FIG. 3 illustrates an embodiment of an electrical control circuit for the motor 14, which automatically starts the motor and stops it when the crank plate has executed one revolution.

This circuit comprises a voltage step-down transformer 41, enabling it to be supplied at a low voltage and thus rendering it safe, only the motor 14 being supplied with the high voltage appearing across the terminals of the primary of the transformer 41.

The motor 14 is associated with an electro-magnetic brake of known kind, which enables the rotation of the motor to be stopped immediately the supply to it is cut off. This brake is released by the energizing of a relay 42 which also acts upon the supply contacts a and b of the motor. The circuit also includes:

an anti-repeater relay 43 operating the contacts c and d and d', the contact c being closed when the relay 43 is not energized, while the contacts d and d' are then open;

a contact 44 operated by a pushbutton 45 arranged on the handle 36 of the lever 35 (see FIG. 2);

a microswitch 46 with two contacts e and f, operated by a bell crank step-up lever 48. This lever is fulcrummed on a pivot pin 49 carried by the plate 12 and is articulated at 50 to one of the ends of a small link 51 whose other end is articulated at 52 to one of the pivoting rings 32.

When, having lowered the control lever 35 until the frame 23 abuts the piece of meat, in the manner already described, the push button 45 is operated, the contact 44 is closed and across the contact c of the relay 43, which contact is closed when the relay is in the dropped condition, the voltage appearing at the secondary of the transformer 41 is applied to the relay 42. The latter releases the electromagnetic brake of the motor and closes the contacts a and b so that the motor 14 is supplied and starts to rotate.

At this instant, through the reaction of the connecting rod 17, the rings 32 are inclined positively downwards and the contactor 46 is closed. With its contact e, it supplied the relay 43 which, when energized, opens the contact c and closed the contacts d and d'.

Through the contact f of the contactor 46 and the contact d of the relay 43, the relays 42 and 43 are maintained in the energized condition so that the motor continues to rotate. Then, the push button 45 can be released and the lever 35 also.

At the end of the revolution of the crank plate 16, the rings 32 are returned to their initial position by the stops 34 on the crossbeam 4, in the manner hereinbefore described. The contacts e and f of the contactor 46 are thus open. The current to the relays 42 and 43 is cut off, the contacts a and b of the motor are opened, the brake is applied and the motor stops. The contacts c and d, d' of the relay 43 return to their initial positions for a new operating cycle which will be triggered by the renewed lowering of the lever 35 and operation of the pushbutton 45.

Other devices are also envisaged. For example, the contactor 46, instead of being operated by one of the rings 32, could be operated by the crossbeam 4 so that the contacts e and f close when said beam moves away from the plate 12 at the start of the rotation of the crank plate 16, and are opened again when, at the end of said rotation, the crossbeam 4 returns to a position adjacent to the plate 12.

We claim:

1. A food tenderizing machine comprising in combination:
    A. a stationary gallows-shaped rigid framework (1) which comprises:
        1. a generally horizontal platform designed to support a piece of food,
        2. a first pair of upright guides (2,2) rooted in said platform and projecting upwards therefrom to form a first vertical guidance plane,
        3. a second pair of upright guides (3,3) rooted in said platform and projecting upwards therefrom to form a second vertical guidance plane horizontally spaced from said first guidance plane, and
        4. a generally horizontal overtopping spindle (37) bridging said first pair of guides (2,2) and fast therewith;
    B. a vertically movable structure guided by said first and second pairs of upright guides (2,2 3,3), which comprises:
        1. a generally horizontal upper plate (12) positioned beneath said spindle (37) and riding on both said first and second pairs of upright guides (2,2 3,3),
        2. a generally horizontal lower frame (23) positioned below said upper plate (12) and depending in vertically spaced relationship therefrom for bodily movement therewith,
        3. a motor (14) supported by said upper plate (12) for bodily movement therewith, and
        4. jammable guide means (32) cooperating with one pair of said upright guides for free guidance of said structure upon descent thereof and movable to jamming position to preclude ascent of said structure on said upright guides until said guide means is returned to non-jamming condition;
    C. a vertically movable assembly guided by said first pair of upright guides (2,2) which comprises:
        1. a generally horizontal intermediate crossbeam (4) positioned between said upper plate (12) and lower frame (23) and riding on said first pair of upright guides (2,2), and
        2. a set (5) of food tenderizing blades (6) secured to the underside of said crossbeam (4) and projecting downwardly therefrom towards the food supporting platform of said framework (1), said set of blades being encompassed by said lower frame (23), whereby said blades (6) are movable between an upwardly retracted position relative to said lower frame (23) when said intermediate crossbeam (4) is adjacent to said upper plate (12) and a downwardly protruding position relative to said lower frame (23) when said intermediate crossbeam (4) is remote from said upper plate (12);
    D. separate and distinct springs (2a,3a) associated respectively with said first and second pairs of upright guides (2,3) and bearing respectively against said vertically movable structure (B) and said assembly (C) for biasing the same upwards;
    E. a variable spacer mechanism (16,17) under the control of said motor (14), interconnecting said upper plate (12) and intermediate crossbeam (4) in varying vertically spaced relationship with respect to each other, said spacer mechanism being adapted, when actuated by said motor, to reciprocate vertically said intermediate crossbeam relatively to said upper plate, and, when at rest, to set said intermediate crossbeam in adjacency to said upper plate; and
    F. control means (35) bearing against said overtopping spindle (37) of said stationary framework (1) for forcedly lowering both said vertically movable structure and assembly against the biasing action thereon of said springs (2a,3a).

2. Machine according to claim 1 wherein said control means comprise a hand-actuated lever (35) pivoted on said overtopping spindle (37), and a linkage (38) between said lever and said upper plate (12).

3. Machine according to claim 2 wherein said lever and linkage occupy an elevated position and their point of connection to said upper plate is substantially centered between the upright guides (2,2) of said first pair and adjacent said first vertical guidance plane.

4. Machine according to claim 3 wherein said motor (14) occupies an elevated position and rests on said upper plate (12) at a locus which is substantially centered between the upright guides (3,3) of said second pair and adjacent said second vertical guidance plane.

5. Machine according to claim 1 wherein said upper plate (12) includes on the one hand two guide passages respectively traversed by said second pair of upright guides (3,3) and on the other hand two of said jammable guide means (32) and respectively associated with said first pair of upright guides (2,2).

6. Machine according to claim 1 wherein said separate and distinct springs comprise a first pair of springs (2a,2a) coiled around said first pair of upright guides (2,2) and bearing against said intermediate crossbeam (4), and a second pair of springs (3a,3a) coiled around said second pair of upright guides (3,3) and bearing against said upper plate (12).

* * * * *

UNITED STATES PATENT AND TRADEMARK OFFICE
CERTIFICATE OF CORRECTION

PATENT NO. : 3,900,918
DATED : August 26, 1975
INVENTOR(S) : Fernand Michel ALLINQUANT et al It is certified that error appears in the above-identified patent and that said Letters Patent are hereby corrected as shown below:

In the Heading, Item [76] Inventors, change "Fernard Michel Allinquant" to -- Fernand Michel Allinquant --.

*Signed and Sealed this* sixteenth *Day of* December 1975

[SEAL]

Attest:

RUTH C. MASON
*Attesting Officer*

C. MARSHALL DANN
*Commissioner of Patents and Trademarks*